Oct. 22, 1968    C. W. TERRY    3,406,567

PORTABLE SHEAR TEST DEVICE

Filed Jan. 27, 1965

INVENTOR.
CYRL W. TERRY
BY
*Ervin F. Johnston*
ATTORNEY

United States Patent Office 3,406,567
Patented Oct. 22, 1968

3,406,567
PORTABLE SHEAR TEST DEVICE
Cyrl W. Terry, Oxnard, Calif., assignor to the United States of America as represented by the Secretary of the Navy
Filed Jan. 27, 1965, Ser. No. 428,590
2 Claims. (Cl. 73—101)

ABSTRACT OF THE DISCLOSURE

The present invention is a device for testing the shear strength of materials such as snow and soil. The shear test device may include a hollow cylinder which has slidably mounted therein a pair of cylindrical-like die members. The die members are disposed at opposite ends of the hollow cylinder and may have substantially semicircular die faces which are in a complementary relationship with respect to one another. A material under test is placed in the hollow cylinder between the die members and upon applying a force on the die members the material may be sheared along a longitudinal plane.

---

The invention described herein may be manufactured and used by or for the Government of the United States of America for governmental purposes without the payment of any royalties thereon or therefor.

Prior to the construction of roads, runways, buildings and the like it has become essential for the engineer to determine the shear strength of the surface materials upon which these structures are to be placed. In most instances the test will be concerned with determining the shear strength of soil, however in icy regions such as the Arctic and Antarctica, snow or ice surfaces may have to be tested for their shear strength prior to construction. In the past it has been the practice to obtain core samples of soil or snow at the site of sample procurement and then transport these samples to a laboratory where they are held in storage for varying lengths of time until they are finally tested by rather elaborate shear testing machines. The time lag between obtaining the core samples and their final testing within the laboratory results in the samples being tested under environmental conditions which are often quite different from those existing at the site of sample procurement. Not only is it difficult to maintain the same moisture content within soil or the same temperature within a snow sample but the samples tend to become more compacted when they are jarred during transportation from the site to the laboratory.

The present invention overcomes these problems by providing a portable shear test device which can be used in conjunction with commercially available portable loading equipment to determine the shear strength of the core samples or any material specimen. The present shear test device is surprisingly simple to construct and will enable a very accurate determination of the shear strength of a material specimen. The portability of the shear test device and the equipment used in conjunction therewith enables the material specimens to be tested at the site of procurement immediately after they have been cored from the earth's surface. Accordingly, the environmental condition of the material specimens will be more nearly maintained since there is little chance for changes to occur.

Accordingly, an object of the present invention is to overcome all of the aforementioned disadvantages of prior art shear test devices;

Another object is to provide a simply constructed portable shear test device which can be used in conjunction with portable supporting equipment to test soil, snow or ice samples at the site of sample procurement;

A further object is to provide a simply constructed and easy to use shear test device which enables a more accurate determination of the shear strength of material specimens; and Other objects, advantages and novel features of the invention will become apparent from the following detailed description of the invention when considered in conjunction with the accompanying drawing wherein.

Figure 2:
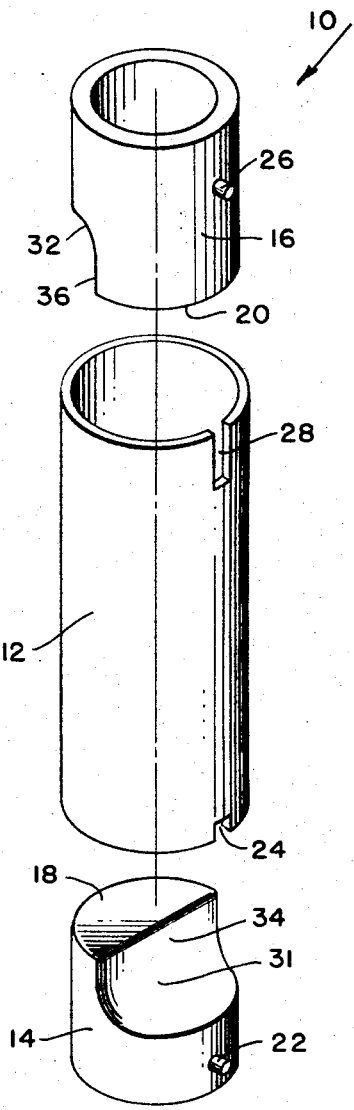
FIG. 2 is an isometric exploded view of the shear test device.
Figure 3:
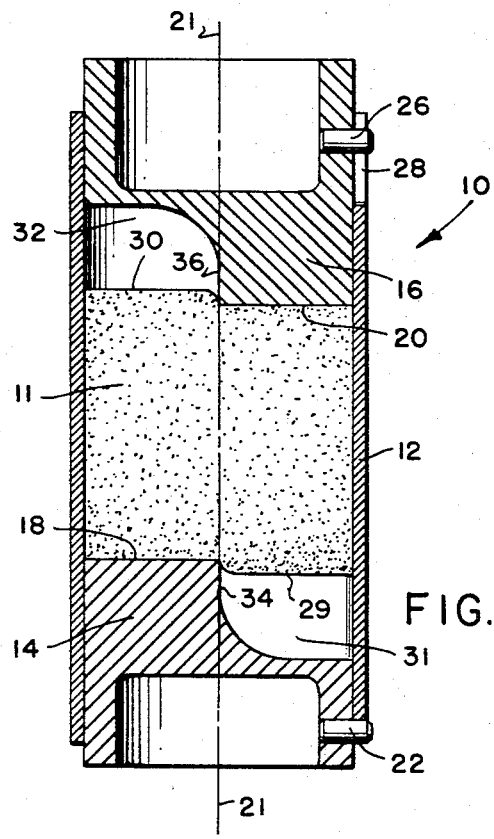
FIG. 3 is a longitudinal cross-sectional view of the shear test device and a material specimen therein.

Referring now to the drawing wherein like reference numerals designate like or similar parts throughout the several views there is shown in FIGS. 2 and 3 a shear test device 10 which includes a hollow cylinder 12 which is adapted to contain a cylindrical plug of material 11 to be tested. A pair of cylindrical-like die members 14 and 16 are slidably mounted at opposite ends within the hollow cylinder 12 so that the inner end of each die member is capable of acting on a respective end of the material specimen 11.

The inner ends of the die members 14 and 16 may have substantially semicircular die faces 18 and 20 respectively which are adapted to contact and apply a pressure to opposite ends of the material specimen 11. If desired the outer ends of the die members 14 and 16 may have lightening holes, as shown in FIGS. 2 and 3. The die faces 18 and 20 are disposed within the hollow cylinder 12 in a complimentary relationship so as to define a shear plane 21 which is perpendicular to and located between the die faces. It is the shear strength of the material specimen along this shear plane that will be tested.

Figure 1:
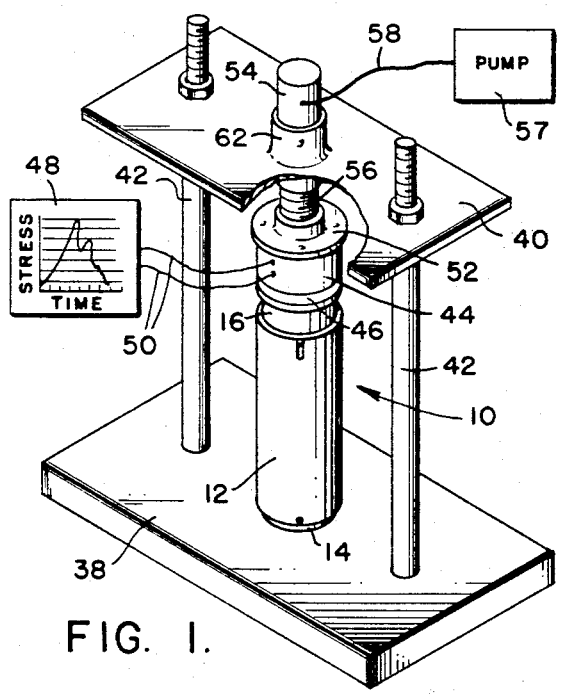
FIG. 1 is a isometric view of the shear test device being compressed by a loading device with a pump and recorder being shown schematically.

It is desirable that a means be provided for retaining the die faces 18 and 20 in the above described complimentary relationship. The retaining means for the die member 14 may include a radially extending guide pin 22 which is press fitted within the die member 14. The guide pin 22 may be slidably disposed within a longitudinally extending slot 24 at one end of the hollow cylinder 12. The slot 24 may extend a short distance so that the guide pin 22 is just received therein, thereby fixing the die member 14 in place when the shear test device 10 is positioned as shown in FIG. 1. The retaining means for the die member 16 may include a radially extending guide pin 26 which is driven into the side of the die member 16. In a like manner the guide pin 26 may be slidably disposed within a longitudinally extending slot 28 within an opposite end of the hollow cylinder 12. The slot 28 may extend further along the wall of the hollow cylinder 12 than the slot 24 so that the die member 16 can be moved to various positions within the cylinder 12. Accordingly, when the shear test device is placed in position on the support equipment, shown in FIG. 1, the die member 16 can be selectively moved to apply the test forces to the material specimen 11 located between the die faces 18 and 20.

It is to be understood that when core samples are taken from the surface of the earth they will be cylindrical in form and that they may be cut to predetermined lengths which are compatible for insertion within the hollow cylinder 12. When a cylindrical specimen is inserted within the hollow cylinder and the die faces 18 and 20 are brought toward one another to apply a force thereto it is desirable that the shear strength of the material specimen be accurately determined along the shear plane 21. Accuracy can be obtained only by providing for disposition of the specimen end portions 29 and 30 which are not contained by the die faces 18 and 20. This has been accomplished by providing the die members 14 and 16 with respective cavities 31 and 32 which will receive the end portions 29 and 30 of the material specimen when pressure is applied. The cavities 31 and 32 have respective side walls 34 and 36 which are contiguous to and substantially perpendicular to respective die faces 18 and 20. Accordingly, as the material specimen commences to fail along the shear plane 21 the end portions 29 and 30, which are not in direct contact with the die faces 18 and 20, will recede within the cavities 31 and 32 respectively without any substantial resistance or opposition as shown in FIG. 3. Such an operation enables an accurate determination of the shear strength of the test specimen along the shear plane 21. If desired, additional accuracy of the shear test device can be obtained by chrome plating the internal surface of the hollow cylinder 12, the cylindrical surfaces of the die members 14 and 16 and the straight extending side walls 34 and 36 forming the cavities 31 and 32.

As shown in FIG. 1, the shear test device 10 is used in conjunction with support equipment in order to determine the shear strength of the material specimens. All of this support equipment is portable and is readily available from various manufacturers. The shear test device 10 is mounted within a frame assembly which may include a bottom plate 38, a top plate 40 and a pair of upstanding rod-like posts 42 which are fixed to both of the plates. The bottom ends of the upstanding posts 42 may be threaded within the bottom plate 38, and the top plate 40 may have openings to receive the posts 42 so that the top plate 40 may be slid to various heights with respect to the bottom plate 38. The top ends of the posts 42 may be threaded and a pair of nuts may be provided for each post, one on each side of the top plate 40, so that the top plate 40 may be securely fixed in the desired position.

As shown in FIG. 1, the shear test device 10 may be mounted within the frame assembly in an upstanding position with the fixed die member 14 resting directly on the bottom plate 38. On top of the top movable die member 16 there may be disposed a compression cell 44 which is capable of indicating the shear test force which is applied to the material specimen 11 through the top die member 16. The compression cell 44 includes an internal plunger (not shown) which is operatively connected to a bottom pressure plate 46. Within the cell 44 very sensitive strain gauges sense the strain of the internal plunger and the strain indications are fed in the form of electrical impulses to a Varian or similar recorder 48 via a pair of electrical leads 50. It has been found satisfactory to use Baldwin SR-4 strain gage elements within the cell 44. The Varian recorder indicates on a chart a plot of the stress or strain indications from the cell 44 as a function of time. A rapid drop of the stress or strain on the resulting curve will then indicate the failure and shear strength of the test specimen.

The compression cell 44 may further include a top pressure plate 52 which is operatively connected to a Porto Power unit 54 for applying the pressure to the shear test device 10 through the cell 44. The Porto Power unit 54 includes a downwardly extending plunger 56 which may be threaded within an upstanding flange of the pressure plate 52. The plunger 56 slidably extends within a cylindrical housing of the unit 54 wherein a tension spring is operatively connected to the plunger 56 so as to bias the plunger 56 in an upward direction. The plunger 26 is forced downwardly against the tension of the spring hydraulically by a fluid pump 57 which is capable of feeding fluid to the Porto Power cylindrical housing through a hydraulic line 58. The pump may be provided with a selectively operable relief valve so that a desired pressure can be applied to the shear test device 10. The top plate 40 of the frame assembly may be provided with an upstanding flange 62 for slidably receiving the cylindrical housing of the Porto Power unit 54 and the upstanding flange 62 may be provided with a set screw for fixedly retaining the cylindrical housing in position.

It is now readily apparent that the present invention provides a novel shear test device which can be easily constructed in portable form and which will enable an accurate determination of the shear strength of various material specimens. The shear test device enables tests to be made of material specimens at the site of specimen procurement, thereby overcoming the problems of transporting the specimens to a remote laboratory and the possibility of environmental changes to the specimens.

I claim:
1. A shear test device for testing the shear strength of materials usch as snow and soil comprising:
   a hollow cylinder which is adapted to contain a discrete quantity of material to be tested;
   a pair of cylinder-like die member slidably mounted at opposite ends with said hollow cylinder for acting on the material therebetween;
   each of said die members having a substantially semicircular die face which is adapted to contact and apply a pressure to said material;
   said die faces being disposed within said hollow cylinder in complementary relationship so as to define a shear plane which is perpendicular to and located between said die faces;
   means for retaining the die faces in said complementary relationship, said means for retaining including:
      said hollow cylinder having at least one slot which extends longitudinally from one end thereof;
      a guide pin connected to at least one of the die members and slidably disposed within the cylinder slot,
whereby the shear strength of the material along said shear plane can be determined by measuring the force required to move the die members toward one another against said material.

2. A shear test device for testing the shear strength of materials such as snow and soil comprising:
   a hollow cylinder which is adapted to contain a discrete quantity of material to be tested;
   a pair of cylindrical-like die members slidably mounted at opposite ends within said hollow cylinder for acting on the material therebetween;
   each of said die members having a substantially semicircular die face which is adapted to contact and apply a pressure to said material;
   said die faces being disposed within said hollow cylinder in complementary relationship so as to define a shear plane which is perpendicular to and located between said die faces;
   means for retaining the die faces in said complementary relationship, said means for retaining including:
      said hollow cylinder having at least one slot which extends longitudinally from one end thereof;
      a guide pin connected to at least one of the die members and slidably disposed within the cylinder slot;
   each die member having a cavity adjacent its die face for receiving a portion of said material when pressure is applied to the material by the die faces; and
   each cavity of a respective die member having a side wall which is contiguous and substantially perpendicular to a respective die face,
whereby the shear strength of the material along said shear plane can be determined by measuring the force required to move the die members toward one another against said material.

References Cited

UNITED STATES PATENTS 3,127,765   4/1964   O'Neil _____ 73—101 X

FOREIGN PATENTS 155,147   11/1963   U.S.S.R.
646,768   10/1962   Italy.

RICHARD C. QUEISSER, *Primary Examiner.*

JAMES H. WILLIAMSON, *Assistant Examiner.*